United States Patent [19]
Labuhn et al.

[11] Patent Number: 6,009,368
[45] Date of Patent: Dec. 28, 1999

[54] ACTIVE VEHICLE DECELERATION IN AN ADAPTIVE CRUISE CONTROL SYSTEM

[75] Inventors: Pamela Irene Labuhn, Shelby Township, Macomb County; William Joseph Chundrlik, Jr., Rochester Hills, both of Mich.

[73] Assignee: General Motors Corporation, Detroit, Mich.

[21] Appl. No.: 08/821,829

[22] Filed: Mar. 21, 1997

[51] Int. Cl.⁶ .................................................. B60K 31/04

[52] U.S. Cl. ........................ 701/96; 701/301; 180/169; 180/179; 342/455; 340/903; 123/352

[58] Field of Search ............................ 701/93, 96, 97, 701/98, 300, 301; 180/167, 168, 169, 176, 177, 178, 179; 123/350, 352; 342/454, 455; 340/901, 902, 903, 904

[56] References Cited

U.S. PATENT DOCUMENTS

| | | | |
|---|---|---|---|
| 5,014,200 | 5/1991 | Chundrlik | 364/426.04 |
| 5,173,859 | 12/1992 | Deering | 364/426.04 |
| 5,396,426 | 3/1995 | Hibino et al. | 701/96 |
| 5,400,864 | 3/1995 | Winner et al. | 180/169 |
| 5,454,442 | 10/1995 | Labuhn | 180/169 |
| 5,708,584 | 1/1998 | Doi et al. | 701/96 |
| 5,749,426 | 5/1998 | Gilling | 701/96 |
| 5,771,007 | 6/1998 | Arai et al. | 701/96 |

*Primary Examiner*—Gary Chin
*Attorney, Agent, or Firm*—Vincent A. Cichosz

[57] ABSTRACT

A vehicle adaptive cruise control system having active deceleration control provides for appropriate decelerations consistent with the objectives of preventing the vehicle from violating a desired minimum distance from a preceding vehicle and efficient utilization of road space through minimization of inter-vehicle spacing.

9 Claims, 3 Drawing Sheets

ACTIVE VEHICLE DECELERATION IN AN ADAPTIVE CRUISE CONTROL SYSTEM

TECHNICAL FIELD

The present invention generally is related to vehicle speed control and more particularly is related to determination of appropriate deceleration rates in an adaptive cruise control system.

BACKGROUND OF THE INVENTION

Conventional cruise control systems control vehicle speed to an operator set speed. Adaptive cruise control systems are known which have varying degrees of interaction with preceding vehicles. A general objective of adaptive cruise control systems is to sense in path objects such as preceding vehicles and to provide throttle control to maintain a predetermined distance therefrom. Such base systems are characterized by passive deceleration, that is to say deceleration effectuated during closed throttle coast.

An exemplary adaptive cruise control system employing active vehicle deceleration, that is to say deceleration effectuated by active, controlled application of the vehicle service brakes, is disclosed in U.S. Pat. No. 5,173,859 to Deering, hereafter "Deering", also assigned to the assignee of the present invention. Deering describes a system wherein vehicle braking control is invoked to decelerate a succeeding vehicle when the succeeding vehicle violates a predetermined range from the preceding vehicle with a range rate indicating that the succeeding vehicle is closing on a preceding vehicle.

In Deering, the determination of a desired succeeding vehicle deceleration is in accordance with coincidental occurrence of a predetermined desired minimum inter-vehicle spacing or range, and convergence of the respective vehicle velocities. Deering operates with the assumption that the preceding vehicle deceleration is adequately accounted for through the relative deceleration expressed implicitly in iterative updates to range rate information. Under certain driving conditions, for example during city driving conditions, the implicit accounting for preceding vehicle deceleration may result in deceleration determinations insufficient to meet certain objectives of the system, for example a minimum separation distance objective. Explicit inclusion of preceding vehicle deceleration into the determination of the desired succeeding vehicle deceleration, still in accordance with coincidental occurrence of the predetermined minimum desired range and convergence of the respective vehicle velocities, provides for improved succeeding vehicle deceleration determinations. However, such inclusion of preceding vehicle deceleration in determining the desired succeeding vehicle deceleration may have the undesirable effect of producing succeeding vehicle deceleration which may be unnecessarily too aggressive resulting in inefficient inter-vehicle spacing during preceding and succeeding vehicle decelerations.

SUMMARY OF THE INVENTION

These shortfalls of the prior art are solved in an adaptive cruise control system which controls the deceleration of a succeeding vehicle closing on a decelerating preceding vehicle by providing the deceleration of the preceding vehicle from a radar computer and determining a deceleration for the succeeding vehicle which will converge the velocity of the succeeding vehicle toward the velocity of the preceding vehicle. Where the succeeding vehicle is projected to first attain zero velocity using the determined deceleration, the succeeding vehicle is decelerated in accordance with the determined deceleration. However, where the preceding vehicle is projected to first attain zero velocity using the determined deceleration, an alternate deceleration for the succeeding vehicle which will diverge the velocity of the succeeding vehicle away from the velocity of the preceding vehicle is determined, and the succeeding vehicle is decelerated in accordance with the alternately determined deceleration.

In accordance with one aspect of the invention, the first deceleration for the succeeding vehicle is determined including a deceleration matching term substantially equivalent to the deceleration of the preceding vehicle, and a deceleration incrementing term that varies inversely with inter-vehicle spacing.

In accordance with another aspect of the present invention, if the projected inter-vehicle spacing at initiation of succeeding vehicle deceleration does not provide a predetermined minimum space, then a predetermined maximum deceleration is used to decelerate the succeeding vehicle.

In accordance with another aspect of the present invention, an adaptive cruise control system controls the deceleration of a succeeding vehicle closing on a decelerating preceding vehicle by calculating a deceleration for the succeeding vehicle which will match the respective vehicle velocities simultaneously with the vehicles attaining a first predetermined inter-vehicle spacing. A positive match point for the vehicle velocities results in deceleration of the succeeding vehicle at a first deceleration substantially equivalent to the calculated deceleration. A match point for the vehicle velocities which is not positive results in deceleration the succeeding vehicle at a second deceleration which will result in substantially a second predetermined inter-vehicle spacing when the succeeding vehicle reaches substantially zero velocity. Either deceleration is preferably limited to a predetermined maximum deceleration. Additionally, if the projected inter-vehicle spacing at initiation of succeeding vehicle deceleration does not provide a predetermined minimum space, then the predetermined maximum deceleration is used to decelerate the succeeding vehicle.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
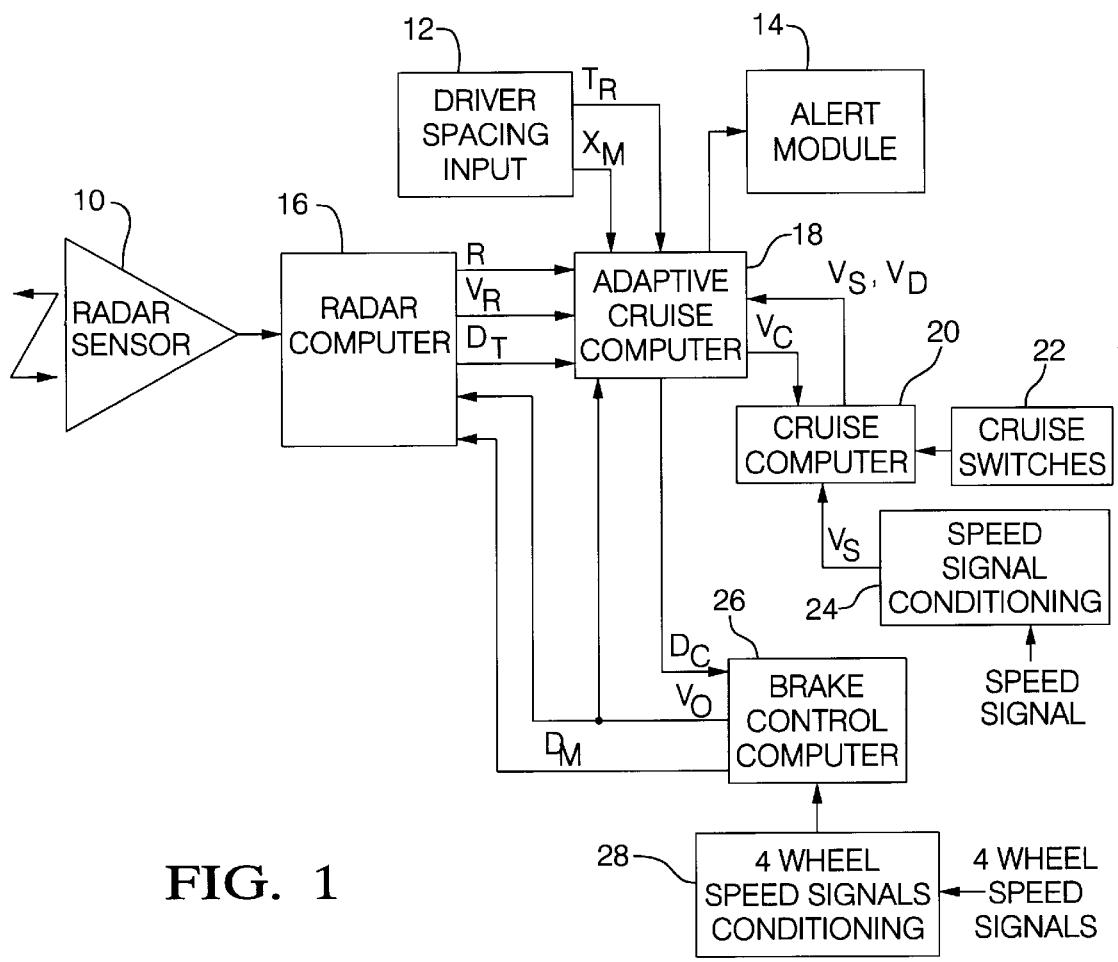
FIG. 1 is a block diagram of an adaptive cruise control system suitable for implementation of the present invention.

The succeeding vehicle includes an adaptive cruise control system as generally illustrated in FIG. 1. The system has a conventional cruise computer 20 which operates in response to conventional operator controlled switches such as an on/off switch, a set switch, a resume/accelerate switch and a brake switch, all of which are represented in the aggregate as cruise switches 22. Speed signal conditioning circuit 24 supplies cruise computer 20 with succeeding vehicle velocity $V_S$ derived from a conditioned raw speed signal indicative of succeeding vehicle speed. The raw speed signal may, for example, be from a conventional rotational speed transducer arrangement such as a variable reluctance sensor cooperating with a toothed gear rotating with the output shaft of the vehicle transmission. Cruise computer 20 also receives a speed command $V_C$ from the adaptive cruise computer 18. The cruise computer uses the speed command $V_C$ and vehicle speed $V_S$ in a conventional closed loop control of the vehicle speed through throttle control. Cruise computer 20 also provides to adaptive cruise computer 18 the vehicle speed $V_S$ and the desired operator set speed $V_D$.

Adaptive cruise computer 18 also interfaces with a brake control computer 26 and radar computer 16 as illustrated. Preferably, additional operator interfacing is accomplished by way of a driver spacing input 12 and alert module 14 as later described. Brake control computer 26 receives a deceleration command $D_C$ from adaptive cruise computer 18 and provides a measure of vehicle speed $V_O$ derived from wheel speed sensing to the adaptive cruise computer 18. The wheel speed sensing is accomplished by way of a four wheel speed signal conditioning circuit 28 operating upon four individual, raw wheel speed signals, one for each of four wheels of the vehicle. The raw wheel speed signals may be provided for example by way of well known variable reluctance wheel speed sensors. All four conditioned signals are provided to brake control computer 26 and may be used thereby in performing traction applications such as anti-lock braking, traction control, and may include advanced features such as active braking and vehicle yaw control. The vehicle speed $V_O$ provided to adaptive cruise control computer 18 is derived from the four discrete wheel speed signals as a predetermined function. The brake control computer additionally provides the vehicle speed $V_O$ and a measured deceleration $D_M$ of the succeeding vehicle—also derived as a predetermined function of the four discrete wheel speed signals—to the radar computer 16. An exemplary brake control computer providing ABS and traction control functions, and suitable for application to the present invention, is commercially available from Delphi Chassis Systems and is generally identified as Electronic Brake and Traction Control Module. Also, an exemplary brake control computer providing additional advanced control functions including active brake control and vehicle yaw control, and suitable for application to the present invention, is commercially available from Delphi Chassis Systems and is generally identified as ICS II Integrated Chassis Controller.

A conventional radar computer 16 provides to the adaptive cruise computer 18 a variety of signals related to an in path preceding vehicle. Radar sensor 10 provides an output signal to radar computer 16 which derives the distance or range R between the succeeding and preceding vehicles, the closing or relative velocity $V_R$ between the preceding and succeeding vehicles (also known as the range rate), and the preceding vehicle deceleration $D_T$. Preceding vehicle deceleration may be provided as a function of the relative deceleration between the succeeding and preceding vehicles, which is derived in the radar computer 16 from the range R and range rate $V_R$, and the measured deceleration $D_M$ of the succeeding vehicle supplied by the brake control computer.

As previously alluded to, additional preferred operator interfacing with the adaptive cruise computer is accomplished by way of driver spacing input 12 and alert module 14. Driver spacing input 12 may take the form of a detented or continuously variable potentiometer whose operator controlled setting corresponds to a desired minimum inter-vehicle spacing $X_M$ and operator reaction time $T_R$. The alert module 14 may take the exemplary form of a vehicle instrument cluster or other display panel visual and/or audible alerting apparatus for conveying predetermined adaptive cruise control system information to the succeeding vehicle operator.

The cruise computer 20, adaptive cruise computer 18, radar computer 16 and brake control computer 26 are general purpose digital computers generally including a microprocessor, ROM, RAM, and I/O including A/D and D/A. Each respective computer has a set of resident program instructions stored in ROM and executed to provide the respective functions of each computer. The information transfer between the various computers, while schematically illustrated in FIG. 1 as individual data lines, is preferably accomplished by way of serial data links between the computers.

Figure 2:
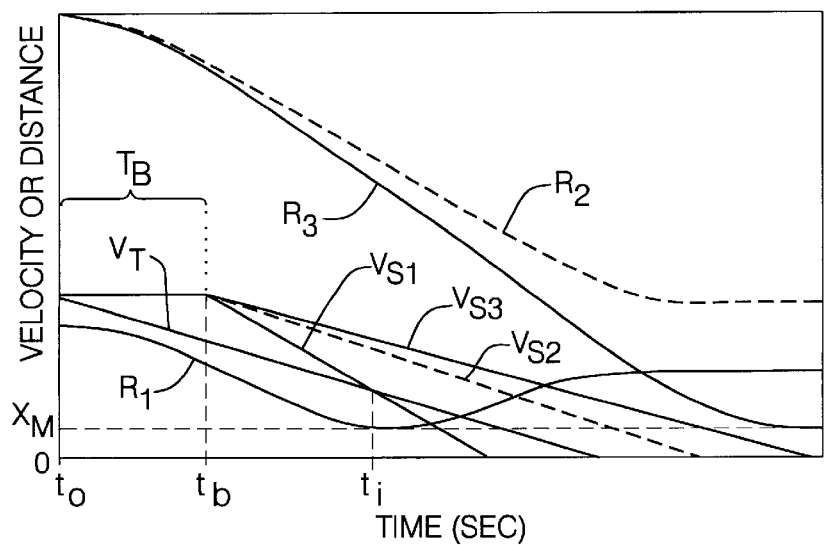
FIG. 2 is a graphical representation of vehicle velocity profiles and inter-vehicle spacing in accordance with the control of the present invention; and, FIGS. 3 and 4 are flow charts representing instruction sets executed by the adaptive cruise computer illustrated in FIG. 1 for carrying out the control of the present invention.

With reference to FIG. 2, the present invention controls the deceleration of the succeeding vehicle in a manner consistent with the mutual objectives of not violating a desired minimum inter-vehicle separation or range and ensuring an efficient inter-vehicle separation. Various scenarios exemplifying operation of the present invention are shown graphically in FIG. 2. Vehicle velocities are labeled with upper case V while inter-vehicle spacings are labeled with upper case R. The velocity subscripted with "T" is associated with the preceding vehicle while velocities subscripted with "S" are associated with the succeeding vehicle. Furthermore, ranges and velocities subscripted with the same numerals are situational groupings of velocities and inter-vehicle spacings as will become more apparent in the description to follow. Time $t_0$ in the figure represents a time corresponding to conditions or events of sufficient import to initiate the deceleration control of the present invention. Such conditions or events may include preceding vehicle deceleration of predetermined magnitude and succeeding vehicle velocity exceeding preceding vehicle velocity. Assumed common among the various scenarios exemplified in FIG. 2 are the initial vehicle velocities for the preceding and succeeding vehicles at a time $t_0$. For all exemplary scenarios of FIG. 2, the deceleration of the preceding vehicle is assumed to be constant from time $t_0$ as shown by the velocity line labeled $V_T$. Additionally, a brake reaction interval $T_B$ always precedes the respective deceleration of the succeeding vehicle and represents a response limitation interval of the braking system analogous to an operator reaction limitation interval such as is inherent in moving one's foot from the accelerator pedal to the brake pedal.

In a first scenario or set of conditions, the inter-vehicle spacing $R_1$ decreases from time $t_0$ through the entire brake reaction interval $T_B$ as the preceding vehicle is decelerating and the succeeding vehicle is maintaining a constant velocity. In accordance with the present invention, the succeeding vehicle is decelerated such that the velocity $V_{S1}$, converges on the preceding vehicle velocity $V_T$ to ensure that the inter-vehicle spacing $R_1$ does not violate a predetermined minimum desired spacing $X_M$. A local minimum inter-vehicle spacing will occur when the succeeding vehicle is no longer closing on the preceding vehicle. This occurs when the succeeding and preceding vehicle velocities are equivalent which in the figure occurs at $t_1$. The deceleration of the succeeding vehicle ($D_O$) which will match vehicle velocities and simultaneously close the inter-vehicle spacing from an initial spacing to a predetermined minimum desired spacing $X_M$ without violating it may be expressed as follows:

$$D_o = \frac{0.5(V_R + D_T \cdot T_B)^2}{R - X_M - V_R \cdot T_B - 0.5 D_T \cdot T_B^2} + D_T \quad (1)$$

where $V_R$ is the relative velocity between the succeeding and preceding vehicles, $D_T$ is the preceding vehicle deceleration, $T_B$ is the brake reaction interval, R is the inter-vehicle spacing, and $X_M$ is the desired minimum inter-vehicle spacing.

The succeeding vehicle deceleration $D_o$ is expressed in terms of the preceding vehicle deceleration $D_T$. Respective vehicle velocity intersection requires that succeeding vehicle deceleration be greater than preceding vehicle deceleration and therefore equation (1) may be thought of as providing a deceleration matching term ($D_T$) and a deceleration incrementing term comprising the factors preceding the deceleration matching term. The denominator of the deceleration incrementing term is representative of the available closing space between the vehicles at the initiation of the succeeding vehicle deceleration and comprises the inter-vehicle spacing R reduced by the desired minimum inter-vehicle spacing $X_M$ and space closed during the brake reaction interval $T_B$.

The available closing space is essentially the range available to the control to match the velocity of the succeeding vehicle to the velocity of the preceding vehicle. Hence, certain minimal inter-vehicle spacing may result in zero or negative values for the denominator indicating that for the preceding vehicle deceleration the inter-vehicle spacing at the termination of the brake reaction interval is at or has violated the desired minimum inter-vehicle spacing, respectively. Recognition of such a condition is preferably handled by requesting maximum deceleration from the brake control computer. In other situations where the denominator is positive, a theoretical succeeding vehicle deceleration in excess of the preceding vehicle deceleration exists. Generally then, the incremental deceleration term varies inversely with the inter-vehicle spacing and more specifically varies inversely with the available closing space between the vehicles at the initiation of the succeeding vehicle deceleration. Therefore, relatively small inter-vehicle spacing would result in a relatively large incremental deceleration term while relatively large inter-vehicle spacing would result in a relatively small incremental deceleration term. A relatively large incremental deceleration term therefore appropriately results in a relatively aggressive deceleration of the succeeding vehicle such that the vehicle velocities are matched within the available inter-vehicle spacing and the desired minimum inter-vehicle spacing is not violated. However, the present invention limits application of the calculated deceleration term from equation (1) to certain conditions, namely that in actual application, the vehicle velocities are limited to forward displacements. That is to say, once a vehicle reaches zero velocity it remains at rest and is not accelerated rearwardly. Equation (1), while mathematically precise in meeting the objective of matching vehicle velocities contemporaneously with the inter-vehicle spacing attaining the minimum desired spacing, is not applied in determining the succeeding vehicle deceleration if the equation results in matching the vehicle velocities at negative velocities.

The undesirable result of applying equation (1) for certain conditions where the velocity match would occur at negative velocities would be that the actual inter-vehicle spacing would approach the desired minimum inter-vehicle spacing yet never reach it, instead reaching a final inter-vehicle spacing in excess of the desired minimum inter-vehicle spacing when both vehicles have reached zero velocity. A set of conditions exemplifying the effect of undesirable application of equation (1) is shown in FIG. 2 by the grouping of velocity lines $V_T$, $V_{S2}$ and inter-vehicle spacing line $R_2$. Generally then, with all else being equal, for relatively large inter-vehicle spacing, a deceleration calculated in accordance with equation (1) is an unnecessarily aggressive deceleration of the succeeding vehicle such that the final inter-vehicle spacing is excessive and an inefficient utilization of roadway. Hence, in accordance with the present invention, an appropriately aggressive deceleration for the succeeding vehicle is determined which results in a desired final inter-vehicle spacing. The desired final inter-vehicle spacing may be different from the desired minimum inter-vehicle spacing but is preferably equivalent thereto. A second deceleration equation is therefore employed to establish the succeeding vehicle deceleration in the case where the convergence of the vehicle velocities would occur after the preceding vehicle attains zero velocity if the deceleration calculated by equation (1) were employed. This case may be determined, for example, by first calculating deceleration in accordance with equation (1) and calculating the amount of time to decelerate each vehicle to zero velocity in accordance with the respective decelerations and the attendant brake reaction interval with respect to the succeeding vehicle only. The deceleration of the succeeding vehicle ($D_o$) which will achieve a predetermined final inter-vehicle spacing when the preceding vehicle first comes to rest may be expressed as follows:

$$D_o = \frac{0.5 \cdot V_o^2}{R - X_M + \frac{V_T^2}{2 D_T} - T_B \cdot V_o} \quad (2)$$

where $V_o$ is the succeeding vehicle velocity, R is the inter-vehicle spacing, $X_M$ is the desired minimum inter-vehicle spacing, $V_T$ is the preceding vehicle velocity, $D_T$ is the preceding vehicle deceleration, and $T_B$ is the brake reaction interval.

In applying the deceleration calculated in accordance with equation (2) to a succeeding vehicle having the same relatively large initial inter-vehicle spacing corresponding to line $R_2$, velocity profile $V_{S3}$ and inter-vehicle vehicle spacing profile $R_3$ for the succeeding vehicle result. In the present example wherein the desired minimum inter-vehicle spacing is also the desired final inter-vehicle spacing, a less aggressive deceleration upon the succeeding vehicle provides for the desired final inter-vehicle spacing equivalent to the desired minimum inter-vehicle spacing thus eliminating undesirably large final spacing as would otherwise result from the application of the more aggressive deceleration of equation (1).

Figure 3:
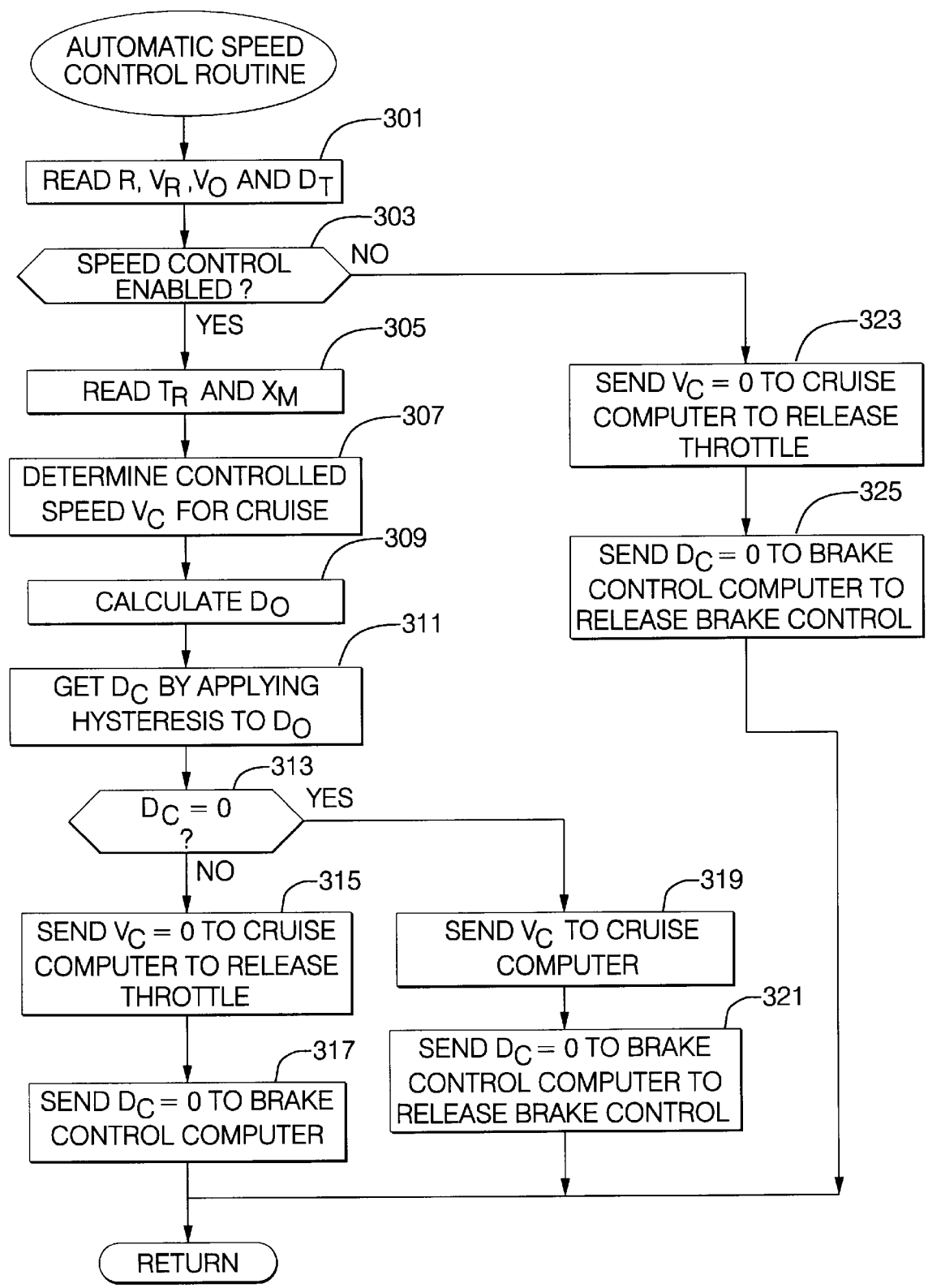
Figure 4:
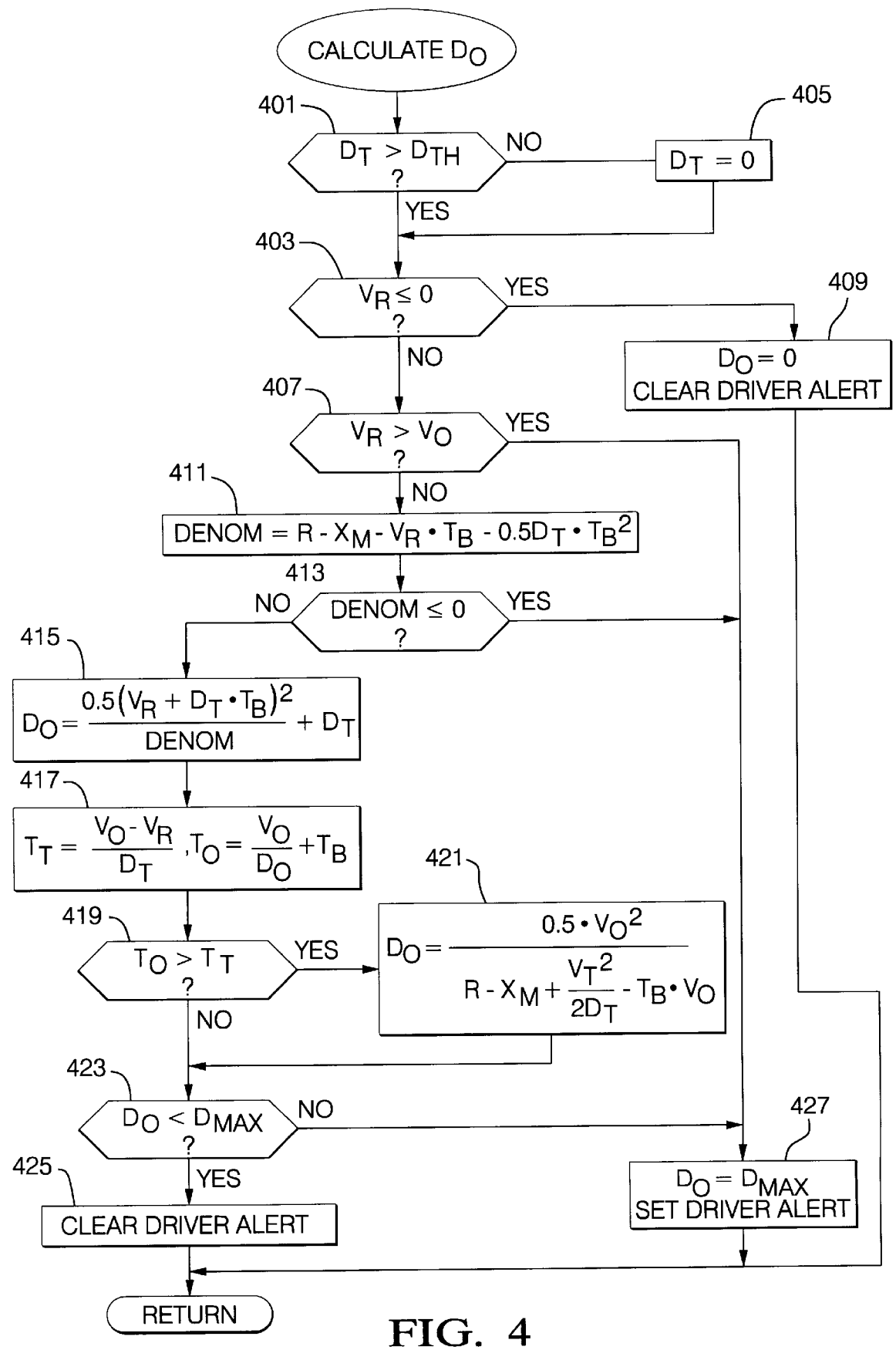

With reference now to FIGS. 3 and 4, flow charts representing sets of steps or program instructions for execution by the adaptive cruise computer 18 of FIG. 1 are shown. The illustrated steps form part of a larger set of instructions executed by the adaptive cruise computer in carrying out other adaptive cruise control functions. For example, initialization steps including setting timers, flags, tables and pointers etc. are carried out when the adaptive cruise computer is first powered up such as at the beginning of a vehicle ignition cycle. Thereafter, a background loop comprising repetitively executed functions such as acquisition and conditioning of inputs, providing outputs, and updating of timers and counters is executed.

In one form of the invention, the steps embodied in the flow diagrams of FIGS. 3 and 4 are executed on a real time interrupt basis every 50 msec. Working variable registers for inter-vehicle spacing R, relative velocity $V_R$ between the preceding and succeeding vehicles (also known as the range rate), succeeding vehicle velocity $V_o$, and the preceding vehicle deceleration $D_T$ are updated at block 301 from input buffers which are updated at various rates in accordance with the particular source of the data. For example, in one implementation, the radar computer 16 updates the inter-vehicle vehicle spacing R, relative velocity $V_R$, and preceding vehicle deceleration $D_T$ approximately every 100 msec while the brake control computer 26 updates the succeeding vehicle velocity $V_o$ approximately every 50 msec.

Block 303 next determines if the speed control is activated requiring further execution of program instructions related to the adaptive cruise control functions of the present invention. If cruise is not enabled, blocks 323 and 325 execute program steps to release control of the throttle and brakes by setting the speed command $V_C$ and deceleration command $D_C$, respectively, to zero. The routine then exits the interrupt to continue normal background loop functions.

If, however, cruise is enabled, block 303 passes control to block 305 whereat a set of program instructions are executed to read the desired minimum inter-vehicle spacing $X_M$ and operator reaction time $T_R$. Next, step 307 determines the speed command $V_C$ in accordance with known methods of adaptive cruise control which reacts to preceding vehicles. For example, the adaptive cruise control as disclosed in U.S. Pat. Nos. 5,014,200 and 5,173,859 to Chundrlik et al. and Deering, respectively, and which are assigned to the assignee of the present invention provide exemplary known control methods. Generally, such control methods perform as conventional speed control systems maintaining an operator set speed in the absence of a preceding vehicle. The presence of a preceding vehicle, however, results in adaptation of the vehicle speed to maintain a controlled inter-vehicle spacing when the preceding vehicle is traveling at or less than the set speed. Deceleration of the vehicle is accomplished by way of throttle release in accordance with a commanded vehicle speed.

Block 309 represents the steps of FIG. 4 to be later described which calculate the desired deceleration $D_o$ of the succeeding vehicle in accordance with the active deceleration objectives of the present invention. Block 311 applies conventional hysteresis techniques to the desired deceleration $D_o$ to arrive at a deceleration command $D_C$ for the brake control computer. The hysteresis applied to the desired deceleration $D_o$ advantageously prevents excessive throttle and brake interaction. Additionally, the hysteresis is effective to ignore values of desired deceleration $D_o$ that are significantly below a predetermined or calibrated value for level-road closed-throttle coast deceleration. One such calibrated value which has successfully been implemented is approximately 0.5 m/s². Also, in the situation where a preceding vehicle is no longer present such as when it moves into an adjacent lane, the deceleration command $D_C$ is slowly decreased to zero to provide a smooth transition back to throttle control.

Block 313 determines if a deceleration by way of brake control is desired by checking the value of the deceleration command. If the deceleration command $D_C$ is zero, brake control is not desired and steps 319 and 321 are executed. If, however, a non-zero value for deceleration command $D_C$ is current, blocks 315 and 317 are executed. Block 319 sends to the cruise computer the previously calculated speed command $V_C$ for conventional closed loop speed control operating on vehicle speed $V_S$ and the speed command $V_C$. Block 321 similarly sends to the brake control computer the null deceleration command $D_C$ to effectuate complete release of the service brakes. Block 315 on the other hand sends to the cruise computer a null speed command $V_C$ to effectuate complete release of throttle control. Block 317 sends to the brake control computer the previously calculated deceleration command $D_C$ to effectuate the desired application of the service brakes.

With reference specifically to FIG. 4, a flow chart representing instruction sets executed by the adaptive cruise control computer in carrying out the present invention, and more specifically for determination of a desired deceleration for the succeeding vehicle is illustrated. The output of the routine of FIG. 4 is integrated into the routine of FIG. 3 at block 309 as previously described.

First, a series of conditional steps are executed to determine the appropriateness of the execution of the calculative instructions generally represented by blocks 411–427. Block 401 is executed to determine whether a significant preceding vehicle deceleration $D_T$ has been detected by comparing it to a predetermined threshold $D_{TH}$. The threshold may be a single calibrated value, for example 0.75 m/s². Where the preceding vehicle deceleration $D_T$ is not significant, it is set to a null value of zero at step 405 and processing continues at block 403; otherwise, the preceding vehicle deceleration $D_T$ is not altered prior to block 403 being executed. Conventional hysteresis can be applied to the threshold to allow values lower than 0.75 m/s² to be used once the preceding vehicle deceleration $D_T$ has exceeded 0.75 m/s² with values lower than an absolute minimum, for example 0.5 m/s², always causing the preceding vehicle deceleration $D_T$ to be set to a null value of zero at step 405. At block 403, a check is made to determine if the vehicles are closing or opening. The range between the vehicles may be increasing even if the preceding vehicle is decelerating where the velocity of the preceding vehicle exceeds that of the succeeding vehicle. If the range is increasing, block 409 is executed to set the desired deceleration to zero and to clear or cause to be cleared any appropriate driver alert, whereafter, the remaining steps in FIG. 4 are bypassed and the routine exited. However, where the range is decreasing, indicating that the succeeding vehicle is closing in on the preceding vehicle, block 407 is next encountered. At block 407, a check is performed to determine if the preceding vehicle is an on-coming vehicle. This is accomplished by determining if the range rate exceeds the succeeding vehicle velocity. Stationary objects will have a range rate equivalent to the succeeding vehicle velocity, while preceding vehicles having the same sense of direction as the succeeding vehicle will have a range rate less than the succeeding vehicle velocity. An oncoming target therefore results in execution of step 427 to set the desired deceleration $D_o$ to a predetermined maximum deceleration $D_{MAX}$, and set any appropriate driver alert, whereafter the routine is exited. When the succeeding vehicle is closing on the preceding vehicle and the range rate is equal to or less than the succeeding vehicle velocity, block 411 is executed.

Block 411 performs a calculation to determine the amount of closing space available in which the deceleration of the succeeding vehicle may take place. This amount is in accordance with the desired minimum inter-vehicle spacing $X_M$ and the reaction interval $T_B$. The inter-vehicle spacing as measured is the starting base value which is reduced by the desired minimum inter-vehicle spacing $X_M$, the amount of inter-vehicle spacing closed during the brake reaction interval in accord with range rate and preceding vehicle deceleration. The calculated value, DENOM, is checked at block 413 to determine if the inter-vehicle spacing at the termination of the brake reaction interval is at or has violated the desired minimum inter-vehicle spacing. Negative values returned for DENOM indicate violation, and a zero returned value indicates that the inter-vehicle spacing is at the minimum desired value. Hence, where DENOM is less than or equal to zero, the inter-vehicle spacing is insufficient to support deceleration of the succeeding vehicle in accord with the objective of preventing violation of the minimum desired spacing, and block 427 is invoked to set the desired deceleration $D_o$ to the predetermined maximum deceleration $D_{MAX}$, and set any appropriate driver alert.

Where at least some inter-vehicle spacing is available in which to perform deceleration of the succeeding vehicle, block 415 is executed to calculate a first succeeding vehicle deceleration, $D_o$. $D_o$ consists of a deceleration matching term, $D_T$, and an incremental deceleration term. DENOM as previously calculated appears as the denominator of the incremental deceleration term and hence the term varies inversely therewith. In other words, relatively small closing space results in relatively large incremental decelerations and vice-versa. The inclusion of the preceding vehicle deceleration $D_T$ in the equation ensures that for any value of incremental deceleration, the respective velocity profiles of the vehicles converge. Blocks 417 and 419 next determine if the convergence of vehicle velocity at the calculated succeeding vehicle deceleration $D_o$ occurs at a positive velocity, or put another way if the succeeding vehicle reaches zero velocity before the preceding vehicle reaches zero velocity. Times for the preceding and succeeding vehicles to reach zero velocity are calculated as $T_T$ and $T_O$, respectively, at block 417. Block 419 then compares the two times to determine the projected order of the vehicles reaching zero velocity at the respective decelerations as determined.

Where the preceding vehicle is projected to reach zero velocity after the succeeding vehicle, the first calculated deceleration $D_o$ is determined to be sufficient to prevent the vehicles from getting any closer than the desired minimum inter-vehicle spacing. In fact, the time at which the velocities match is the time at which the inter-vehicle spacing is at a minimum corresponding to the desired minimum inter-vehicle spacing. The final or at rest inter-vehicle spacing, however, will be greater than the desired minimum inter-vehicle spacing since after the velocities match the spacing opens as the succeeding vehicle deceleration is below the preceding vehicle velocity.

Where the preceding vehicle is projected to reach zero velocity prior to the succeeding vehicle, block 421 calculates a second succeeding vehicle deceleration, $D_o$, to cause the final or at rest inter-vehicle spacing to be the desired minimum inter-vehicle spacing $X_M$. Alternative final inter-vehicle spacing may be substituted for $X_M$ if desired.

In either the case where the first or second calculated succeeding vehicle velocity remains active after block 419, block 423 next determines if the calculated deceleration exceeds a predetermined maximum deceleration, $D_{MAX}$, which generally represents a fixed calibration limit or alternatively a variable limit which corresponds to an operator controlled setting. Calculated succeeding vehicle decelerations equal to or in excess of $D_{MAX}$ results in block 427 setting $D_o$ to the maximum limit and setting any appropriate driver alert. On the other hand where the calculated deceleration $D_o$ is within the predetermined deceleration limit, block 425 clears any driver alerts. The routine of FIG. 4 exits to the routine of FIG. 3 at block 309 wherein the calculated deceleration $D_o$ is returned for application to the brake control computer as described.

While the invention has been described with respect to certain preferred embodiments, it is anticipated that certain modifications, changes and substitutions may be apparent to one having ordinary skill in the art. Therefore, the description of the embodiments contained herein are given by way of non-limiting example.

We claim:

1. A method of controlling the deceleration of a succeeding vehicle closing on a decelerating preceding vehicle, the vehicles having respective vehicle velocities and being separated by inter-vehicle spacing, the method comprising the steps:

providing the deceleration of the preceding vehicle;

determining a first deceleration for the succeeding vehicle which converges the velocity of the succeeding vehicle toward the velocity of the preceding vehicle;

projecting which of the preceding and succeeding vehicles will first attain zero velocity in accordance with the deceleration of the preceding vehicle and the first deceleration for the succeeding vehicle;

in the case of the succeeding vehicle being the one of the vehicles projected to first attain zero velocity, decelerating the succeeding vehicle in accordance with the first deceleration; and, in the case of the preceding vehicle being the one of the vehicles projected to first attain zero velocity, determining a second deceleration for the succeeding vehicle which diverges the velocity of the succeeding vehicle away from the velocity of the preceding vehicle, and decelerating the succeeding vehicle in accordance with the second deceleration.

2. The method as claimed in claim 1 wherein the first deceleration for the succeeding vehicle includes a deceleration matching term substantially equivalent to the deceleration of the preceding vehicle, and a deceleration incrementing term that varies inversely with said inter-vehicle spacing.

3. The method as claimed in claim 1 further comprising the steps:

projecting whether said inter-vehicle spacing at initiation of the succeeding vehicle deceleration provides a predetermined minimum space; and, when said projected inter-vehicle spacing at initiation of the succeeding vehicle deceleration does not provide the predetermined minimum space, decelerating the succeeding vehicle in accordance with a predetermined maximum deceleration.

4. A method of controlling deceleration of a succeeding vehicle that is closing on a decelerating preceding vehicle, the vehicles having respective vehicle velocities and being separated by inter-vehicle spacing, the method comprising the steps:

calculating a first deceleration of the succeeding vehicle which would result in the respective vehicle velocities reaching an equivalent velocity at the same time that the inter-vehicle spacing reaches a first predetermined space;

decelerating the succeeding vehicle at said first deceleration when said equivalent velocity is positive; and, when said equivalent velocity is not positive, decelerating the succeeding vehicle at a second deceleration which would result in said inter-vehicle spacing reaching a second predetermined space at the same time that the succeeding vehicle velocity reaches zero.

5. The method as claimed in claim 4 further comprising the step of limiting the deceleration of the succeeding vehicle to a predetermined maximum deceleration.

6. The method as claimed in claim 4 further comprising the steps:

projecting whether said inter-vehicle spacing at initiation of the succeeding vehicle deceleration provides a predetermined minimum space; and, when said inter-vehicle spacing at initiation of the succeeding vehicle deceleration does not provide the predetermined minimum space, decelerating the succeeding vehicle in accordance with a predetermined maximum deceleration.

7. The method as claimed in claim 4 wherein the first and second predetermined spaces are equivalent.

8. A method of controlling deceleration of a succeeding vehicle that is closing on a decelerating preceding vehicle, the vehicles having respective vehicle velocities and being separated by an inter-vehicle spacing, the method comprising the steps:

determining deceleration of the preceding vehicle;

calculating a first deceleration for the succeeding vehicle as a function of velocity differential of the succeeding and preceding vehicles, deceleration of the preceding vehicle, a predetermined deceleration reaction time, the inter-vehicle spacing, and a predetermined desired minimum inter-vehicle spacing;

calculating time required to decelerate the preceding vehicle to zero velocity at the deceleration of the preceding vehicle;

calculating time required to decelerate the succeeding vehicle to zero velocity at the first deceleration for the succeeding vehicle;

when the time required to decelerate the preceding vehicle to zero velocity is greater than the time required to decelerate the succeeding vehicle to zero velocity, decelerating the succeeding vehicle at substantially the first deceleration for the succeeding vehicle; and, when the time required to decelerate the preceding vehicle to zero velocity is not greater than the time required to decelerate the succeeding vehicle to zero velocity, calculating a second deceleration for the succeeding vehicle as a function of said succeeding and preceding vehicle velocities, said deceleration of the preceding vehicle, the predetermined deceleration reaction time, the inter-vehicle spacing, and the predetermined desired minimum inter-vehicle spacing, and decelerating the succeeding vehicle at said second deceleration.

9. A method of controlling deceleration of a succeeding vehicle that is closing on a decelerating preceding vehicle, the vehicles having respective vehicle velocities and being separated by inter-vehicle spacing, the method comprising the steps:

determining whether a deceleration of the succeeding vehicle exists which would result in the respective vehicle velocities reaching an equivalent velocity greater than a predetermined velocity at the same time that the inter-vehicle spacing reaches a first predetermined space;

in the case of said deceleration existing, decelerating the succeeding vehicle at the lesser of said deceleration and a predetermined maximum deceleration; and, in the case of said deceleration not existing, decelerating the succeeding vehicle at a deceleration which would result in said inter-vehicle spacing reaching a second predetermined space at the same time that the succeeding vehicle velocity reaches zero.

* * * * *